(No Model.)
W. R. PATTERSON.
APPARATUS FOR FILLING LEAD PIPES OF TELEGRAPH CABLES.
No. 311,913. Patented Feb. 10, 1885.
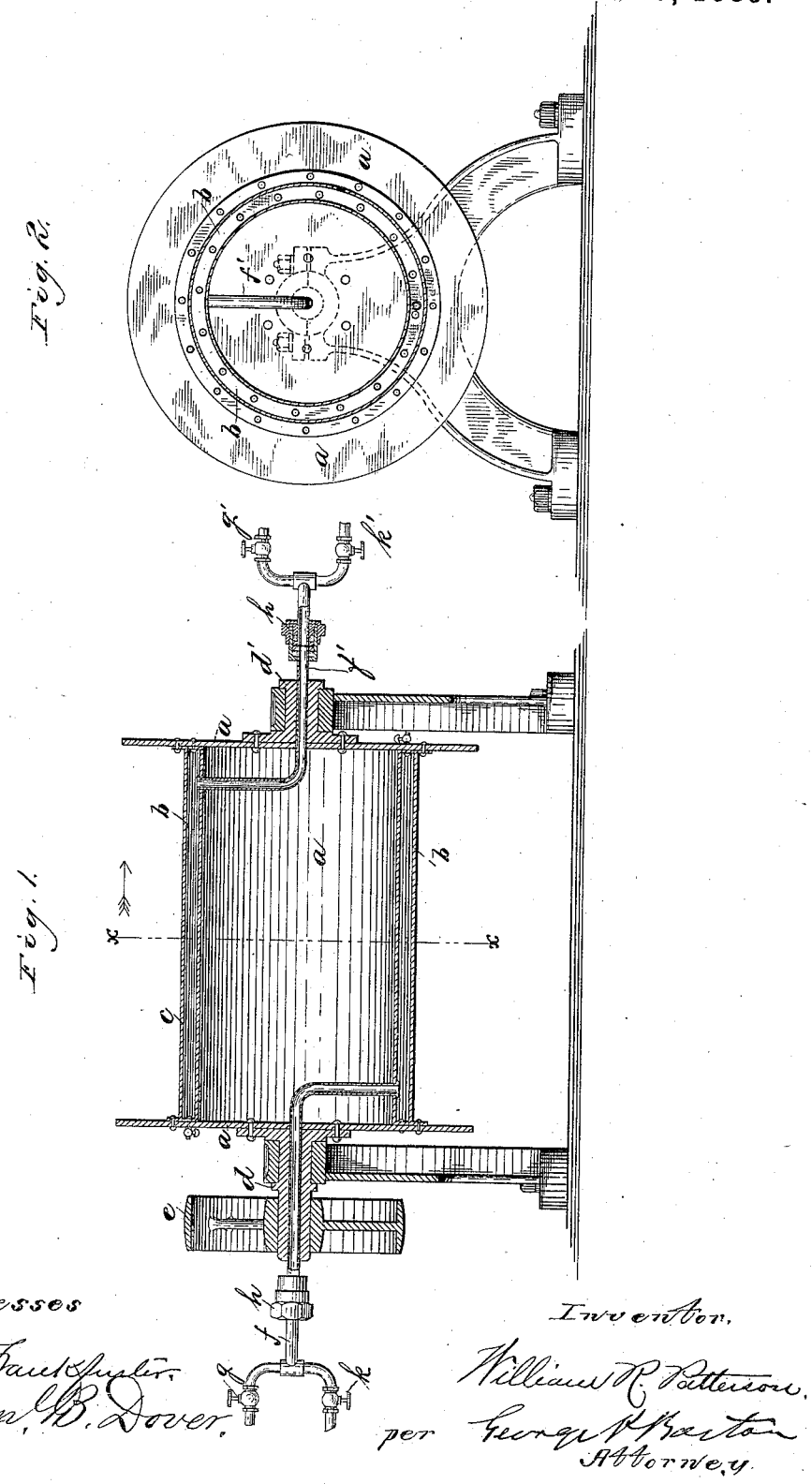

UNITED STATES PATENT OFFICE.

WILLIAM R. PATTERSON, OF CHICAGO, ILLINOIS, ASSIGNOR TO THE WESTERN ELECTRIC COMPANY, OF SAME PLACE.

APPARATUS FOR FILLING LEAD PIPES OF TELEGRAPH-CABLES.

SPECIFICATION forming part of Letters Patent No. 311,913, dated February 10, 1885.

Application filed July 18, 1884. (No model.)

*To all whom it may concern:*

Be it known that I, WILLIAM R. PATTERSON, a citizen of the United States, residing at Chicago, in the county of Cook and State of Illinois, have invented a certain new and useful Improvement in Apparatus for Filling Lead Pipes of Telegraph-Cables, (Case 39,) of which the following is a full, clear, concise, and exact description, reference being had to the accompanying drawings, forming a part of this specification.

My invention relates to apparatus for filling flexible telegraph-cables with insulating substances; and it consists in a reel provided with a drum having an annular space which may be filled with steam while the cable is being filled with the hot insulating substance, and afterward with cold water, so as to cool the cable quickly after it is filled.

My invention is illustrated in the accompanying drawings, in which Figure 1 is a central longitudinal section of a reel embodying my invention. Fig. 2 is a transverse sectional view thereof, as indicated by line $xx$ of Fig. 1.

The drum $a$ may be mounted on suitable bearings, as shown, and should be of sufficient length and circumference to hold the cable which is to be wound thereon in preferably one layer.

I preferably provide an annular space, $b$, next to the plate $c$, upon which the cable is wound. The axles $d\ d'$ are preferably hollow, so as to allow the pipes to pass through and connect with the chamber $b$. The drum may be turned by a belt applied to the driving-pulley $e$, or in any other well-known way. The pipes $ff'$ are connected through the axles with the chamber $b$, preferably as shown. The annular chamber is provided for the sake of economy, though it is evident that the whole of the interior of the drum might be used; and it is also evident that the pipes might be connected directly to the drum or annular chamber, if openings were not provided in the axles, in which case it would be necessary to disconnect the pipes before turning the reel. In each of these pipes I have provided a coupling, $h$, which allows the drum to turn without disturbing the connections with the pipes. Each pipe is provided with two branches—one for steam and the other for cold water—so that the chamber $b$ may be filled with steam or cold water, as desired, for the purpose of heating and cooling the cable wound upon the drum of the reel. Thus by opening, for instance, the cocks $g\ g'$ steam or hot water may be allowed to circulate through the annular space $b$, so as to keep the cable hot while being filled. After the cable has been filled with the melted paraffine, or other insulating substance, forced in hot, the steam or hot water may be shut off and cold water turned on by means of the cocks $k\ k'$. The cable may thus be cooled readily after it is filled.

Heretofore after the cable was ready for filling I have coiled it upon a reel mounted on a truck which is run into the oven so as to keep the cable hot while the paraffine is forced in. Afterward the truck was drawn out of the oven, so as to allow the cable to cool before being tested with the galvanometer. From eight to twelve hours have been required for cooling the cable sufficiently for testing; and in case of a leak in cable-pipe it has been necessary to stop the process of filling and remove the cable from the oven and wind it on another reel to find the leak.

By the use of my invention the truck and oven are dispensed with, while the time of heating, and more especially the time of cooling, is greatly reduced, and in case of a leak the defect may be readily found.

I claim—

1. The reel with a flexible cable wound thereon during the process of filling, and provided with the chamber $b$, in combination with pipes leading thereto through the hollow axles, and cocks for turning on steam and cold water, whereby the cable wound upon the drum may be heated and cooled, substantially as and for the purpose specified.

2. The combination, with the drum adapted to carry the flexible telegraph-cable coiled thereon during the process of filling the said cable, and provided with the annular chamber, of the hollow axles, the driving-pulley, the pipes provided with joints, and the cocks for turning on or off the steam or water, substantially as and for the purpose specified.

3. The drum adapted to hold a cable coiled thereon, a chamber within the drum, pipes connecting with the chamber, and valves whereby steam or water may be introduced into the chamber for heating and cooling the cable.

In witness whereof I hereunto subscribe my name this 15th day of July, A. D. 1884.

WILLIAM R. PATTERSON.

Witnesses:
   GEORGE P. BARTON,
   HENRY FRANKFURTER.